United States Patent [19]

Branch

[11] Patent Number: 5,104,202
[45] Date of Patent: Apr. 14, 1992

[54] WHEEL BEARING LUBRICATION APPARATUS AND METHOD OF LUBRICATING A WHEEL BEARING

[76] Inventor: Frederick H. Branch, Rte. 1, Box 208, Goodman, Miss. 39079

[21] Appl. No.: 548,573

[22] Filed: Jul. 5, 1990

[51] Int. Cl.⁵ ............................................. B60B 27/00
[52] U.S. Cl. .............................. 301/108 R; 384/485
[58] Field of Search ........... 301/108 R, 108 A, 108 S, 301/108 TW; 277/72 FM, 152; 384/482, 484, 485, 143, 147; 24/284

[56] References Cited

U.S. PATENT DOCUMENTS

| | | | |
|---|---|---|---|
| 473,537 | 4/1892 | Weidaw | 24/284 |
| 771,048 | 9/1904 | Emerick . | |
| 2,022,041 | 11/1935 | Kliesrath | 301/37 S |
| 2,617,698 | 11/1952 | Gaines | 301/108 R |
| 3,064,982 | 11/1962 | Stephens | 301/108 TW |
| 3,142,520 | 7/1964 | Mueller | 384/485 |
| 3,177,041 | 4/1965 | Isenbarger | 301/108 TW |
| 3,393,015 | 7/1968 | Kaufman . | |
| 3,395,950 | 8/1968 | Brandt | 301/108 R X |
| 3,649,080 | 3/1972 | Molinare | 301/108 R |
| 3,858,950 | 1/1975 | Otto | 384/485 |
| 4,190,133 | 2/1980 | Ploeger . | |
| 4,792,242 | 12/1988 | Colanzi, Jr. et al. | 384/486 X |
| 4,799,808 | 1/1989 | Otto | 384/486 X |

FOREIGN PATENT DOCUMENTS

| | | | |
|---|---|---|---|
| 506867 | 10/1956 | Canada | 301/108 S |
| 0141801 | 6/1988 | Japan | 301/108 SC |
| 279 | 1/1927 | United Kingdom | 24/284 |

*Primary Examiner*—Russell D. Stormer
*Attorney, Agent, or Firm*—Wigman & Cohen

[57] ABSTRACT

An apparatus for lubricating a wheel hub is disclosed. The apparatus generally comprises a wheel hub, wheel bearings mounted within the bore of the wheel limb for supporting an axle, a hub cap forming a closure cap for the outer end of the wheel hub, an outwardly yieldable bearing seal positioned at the inner end of the wheel bearing and an annular clamp for retaining the seal but allowing sections of the seal to yield. In operation, lubricant under pressure is introduced into the hub cavity from the outer end. The lubricant is then forced from the outer end to the inner end of the hub where the excess lubricant is discharged by the yieldable seal.

10 Claims, 2 Drawing Sheets

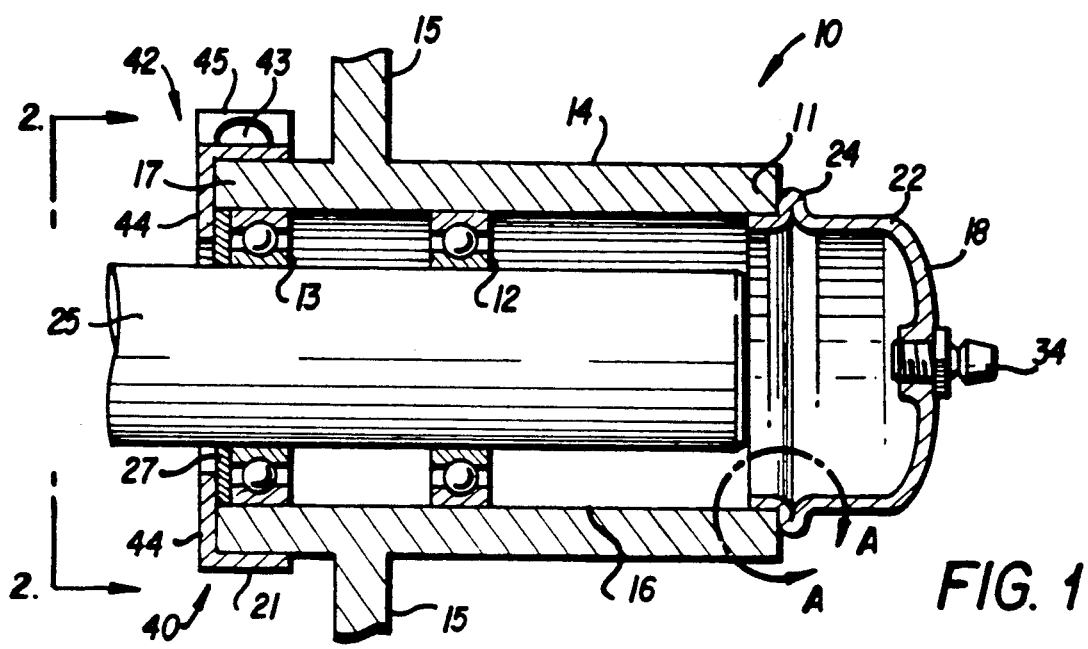
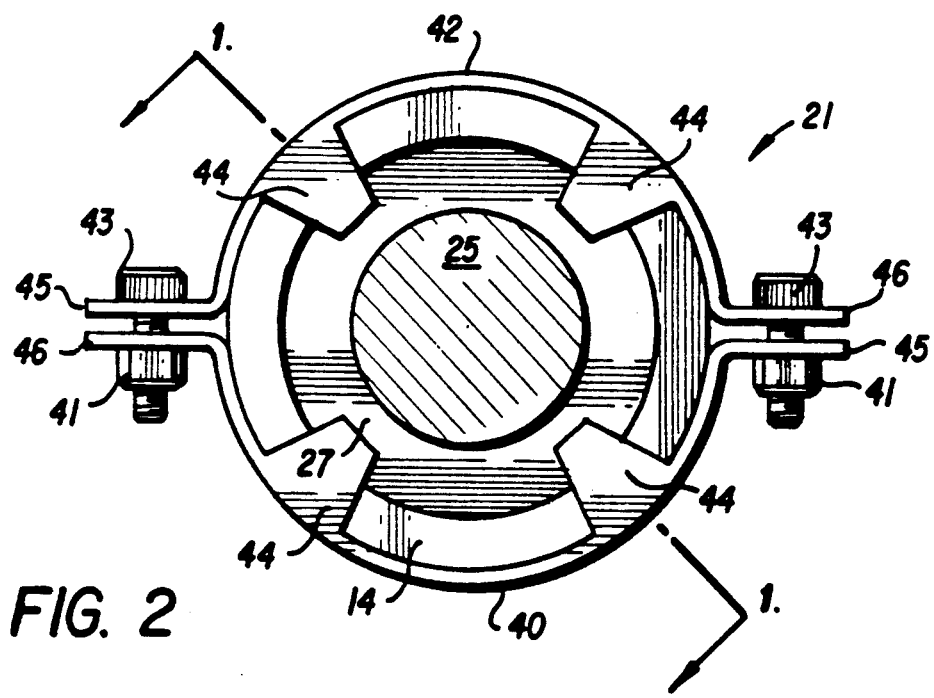

WHEEL BEARING LUBRICATION APPARATUS AND METHOD OF LUBRICATING A WHEEL BEARING

FIELD OF THE INVENTION

The present invention relates to a wheel bearing lubricator and a method of lubricating wheel bearings. More particularly, the invention relates to a sealed hub, with wheel bearings which can be lubricated in situ without the need to remove or disassemble any of the components of the wheel bearing or wheel hub.

DESCRIPTION OF THE PRIOR ART

The conventional method of lubricating wheel bearings involves removal of the hub cap, removal of the wheel and hub from the axle, manually packing grease in the bearings, reassembly and replacement of the wheel and hub on the axle. This lubrication method is cumbersome, time consuming and costly, especially in the case of wheeled equipment which requires frequent repacking of wheel bearings, such as farm machines and the like. Farm machinery and other wheeled, off-the-road equipment that operate in a constant environment of dirt, dust, soil or other foreign matter require virtually daily lubrication of the wheel bearings to insure that the bearings are not contaminated with foreign matter that would necessitate premature repair or replacement of the bearings, seals or wheel hubs.

Attempts to obviate the aforementioned disadvantages of the conventional lubrication method include hub caps provided with a built-in grease fitting to allow the bearings to be lubricated without removal of the hub cap. The hub caps disclosed in U.S. Pat. No. 3,649,080 to Molinare, U.S. Pat. No. 3,393,015 to Kaufman, and U.S. Pat. No. 4,190,133 to Ploeger are representative of this type of hub cap lubricator.

In each of the above mentioned patents, the lubricant is injected into a sealed hub cavity by way of a grease fitting provided in the hub cap. A pressure relief valve or other means for relieving the pressure exerted by the injected grease is provided in or adjacent the hub cap. The hub cap of the Ploeger patent is provided with an overflow aperture in the wall of the hub cap body to relieve excess lubricant pressure. Molinare discloses a pressure relief valve positioned in the end of the hub cap adjacent the grease fitting. In Kaufman, a hole is provided in the wall of the hub cap which is closed by an 0-ring which yields outwardly to relieve excess pressure.

These prior art devices thus position the pressure relief valve or means in the hub cap and in close proximity to the grease fitting so as to provide a convenient visual indication that the cavity has been filled with grease. However, when the pressure relief means (at the lowest pressure) is positioned in the hub cap or at the same end of the hub as the lubricant inlet or grease fitting (at the highest pressure) the flow of grease through the bearing may be channeled directly from the grease fitting to the pressure relief means. Consequently, there may be little or no flow of clean grease through all the bearing components resulting in retention of contaminated grease in the bearings and the likelihood of premature bearing failure.

SUMMARY OF THE INVENTION

In view of the foregoing limitations and shortcomings of the prior art devices, it should be apparent that a need still exists in the art for a lubricating method and apparatus for a sealed wheel bearing which effectively and thoroughly flushes contaminated grease from the wheel bearing and insures proper lubrication of all bearing components with clean grease. The terms "grease" and "lubricant" are used interchangeably herein.

Accordingly, it is a primary object of this invention to provide a lubricating apparatus and method wherein the lubricant is constrained to flow from one end of the hub to the other so that dirt and contaminated grease can be effectively flushed from the hub and the bearing components within the hub.

Another object of the present invention is to provide a lubrication device with improved means for releasably securing the hub cap to the wheel hub so that the cap does not become dislodged when the pressure in the hub cavity increases during lubricant injection.

Still another object of this invention is to provide a lubricating device which is inexpensive to manufacture and easy to operate.

Yet another object of the present invention is to provide a lubricating device which can be adapted for use with most standard wheel hubs and axles and can be supplied with the original equipment or retrofitted to existing equipment.

Briefly described, the aforementioned objects are accomplished according to the invention by providing a cup-shaped hub cap with a grease fitting provided through the end thereof. The annular rim of the hub cap is provided with a plurality of protrusions or, alternatively, with threads or annular ribs to provide a secure, substantially pressure-tight connection between the hub cap and the outer cylindrical end of the wheel hub.

An annular clamp is fitted over the inner end of the hub adjacent a bearing seal. Preferably, the clamp is constructed so that it can be attached to the wheel hub without requiring removal of the hub from the axle. In the preferred embodiment, the clamp comprises two clamp halves secured together about the hub by a pair of fasteners. The clamp has a plurality of inwardly directed radial fingers mounted in spaced relation to one another which function to retain the annular bearing seal in place during lubrication of the bearing without blocking the escape of excess grease from around the seal at the inner end of the hub. The clamp could also be provided as an annular band or belt with two free ends that can be wrapped about the hub end and secured at its free ends. Other forms of clamps or devices for retaining a seal at the inner end of the hub so as to permit the escape of a controlled amount of grease from around the seal will be apparent to those skilled in the art in light of the teachings herein.

According to the method of the invention, a hub cap having a grease fitting is mounted to the outer end of a wheel hub. A bearing seal is positioned in the other or inner end of the wheel hub and retained in place in such a way as to permit a controlled amount of pressurized grease to escape past the seal. Grease is applied under pressure to the grease fitting so that clean grease is forced from the outer end of the hub to the inner end thereof thereby forcing any dirt and contaminated grease through the hub and past the seal. The seal is preferably one of a known type that has a flexible rubber or plastic sealing surface that is deformable at a sufficiently high pressure to permit escape or leakage of a controlled amount of grease past the seal.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a longitudinal cross-section view, taken along line 1—1 of FIG. 2, of a wheel hub in which the bearing lubrication apparatus of the invention is installed;

FIG. 2 is a cross-section view taken along line 2—2 of FIG. 1 showing the manner in which the annular clamp retains the bearing seal;

DETAILED DESCRIPTION OF THE INVENTION

Figure 3:
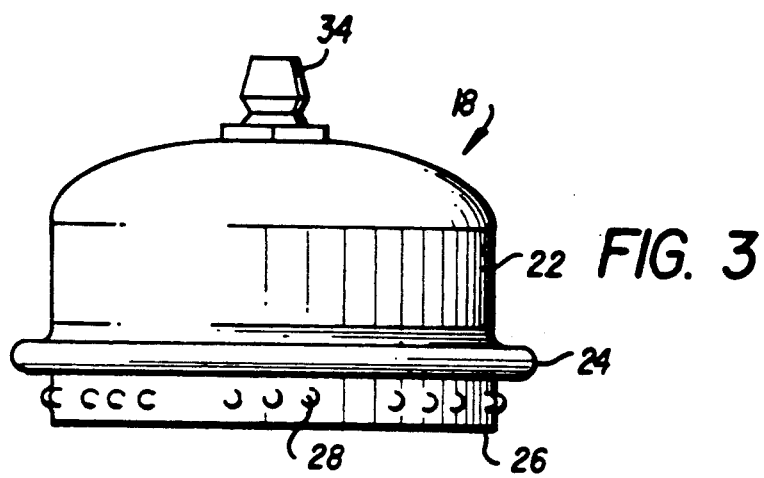
FIG. 3 is a side elevation view of the hub cap.

Referring now in detail to the drawings wherein like parts are designated by like reference numerals throughout, there is illustrated in FIG. 1 a cross-sectional view of a wheel hub lubricator incorporating the bearing lubrication apparatus of the invention and designated generally by reference numeral 10. The wheel bearing lubricator 10 provides means for applying a lubricant under pressure to spaced wheel bearings 12,13 located in wheel hub 14. Specifically, the wheel hub 14 is a generally cylindrical tubular structure with an outer end 11 and an inner end 17 and having radially extending wheel members 15 for connection to a solid or pneumatic tire (not shown). Hub 14 has a central bore 16 into which conventional antifriction bearings 12,13 are mounted for rotatably supporting an axle 25 of wheeled equipment.

The lubricator 10 includes a hub cap 18 securely, but removably, connected to the hub 14 to form a closure cap at the outer end 11 thereof. Hub cap 18 is provided with a conventional grease fitting 34 through which the lubricant is introduced into the wheel hub cavity. Hub cap 18 is preferably formed of a sheet of a steel alloy by drawing into a cup-shape with an annular wall 22. Wall 22 is formed with an outwardly protruding annular flange or bead 24 and terminates in an annular rim 26 for engagement with bore 16 at the outer end 11 of hub 14. An interference fit of about 0.012 inch between bore 16 and rim 26 has been found to provide a snug sealing connection between the hub cap 18 and hub bore 16 for a hub with a 2-3 inch diameter bore.

Figure 4:
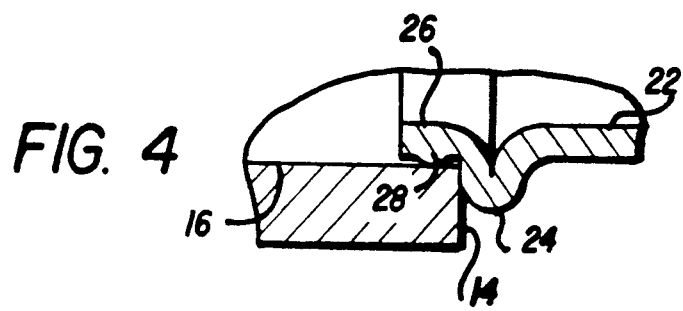
FIG. 4 is an enlarged view of detail A of FIG. 1.

With reference to FIGS. 3 and 4, in the preferred embodiment of the invention, rim 26 is provided with a plurality of protrusions or dimples 28 which may be formed by upsetting the surface of rim 26 from the inside thereof. The protrusions 28 function to provide a tighter grip between rim 26 and bore 16 so as to withstand a greater internal lubricant pressure in the hub cavity without dislodgement.

Figure 5:
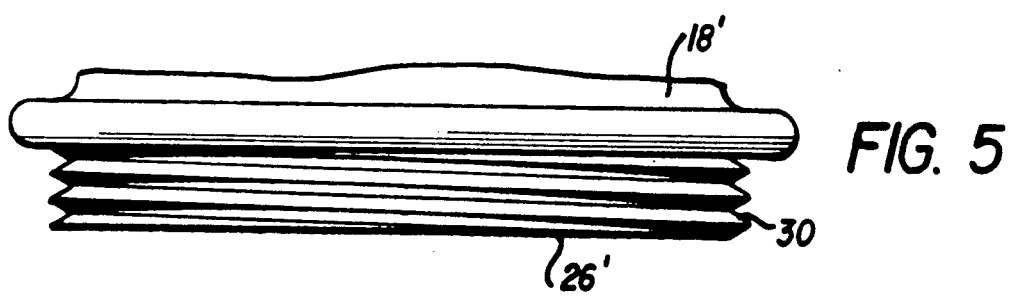
FIG. 5 is an elevation view, partially fragmented, of a second embodiment of the hub cap.
Figure 6:
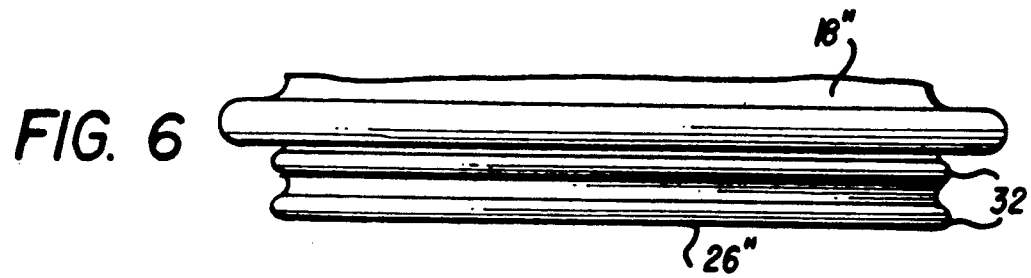
FIG. 6 is an elevation view, partially fragmented, of a third embodiment of the hub cap.

FIGS. 5 and 6 illustrate alternate embodiments for securing the hub cap to the hub 14 in a substantially sealed manner. According to the FIG. 5 embodiment, the annular rim 26' of hub cap 18' is provided with a thread 30 which mates with a corresponding thread (not shown) in bore 16 at the outer end 11 of hub 14. In the FIG. 6 embodiment, the rim 26" of hub cap 18" is provided with one or more annular ribs 32 which function in a manner similar to protrusions 28 to form a tight sealing fit between the hub cap 18" and the bore 16 at the outer end 11 of the hub 14.

Referring again to FIG. 1, an annular gasket or seal 27, constructed of a resilient seal material, such as rubber or plastic, or a combination of rigid and resilient materials, is disposed at the inner end 17 of the hub 14 adjacent bearing 13 for sealing the inner end of the hub between the walls of the bore 16 and the axle 25 while permitting free rotation of the wheel hub about axle 25. An annular clamp 21 (FIGS. 1 and 2) is secured to the exterior surface of the inner end 17 of the hub 14 and functions to retain the seal 27 in the bore 16 next to bearing 13 by means of a plurality of fingers 44 which extend radially inwardly toward, but not in contact with, the axle 25 as best shown in FIG. 2. In the preferred embodiment, the clamp 21 is formed in two symmetrical parts or halves comprising semicircular bands 40,42. The inner surfaces of the bands 40, 42 which engage the hub 14 are preferably knurled or provided with some other non-slip or high friction surface so as to provide a tight, gripping and snug fit to the hub 14. The trapezoidal-shaped fingers 44 extend from one edge of each band 40,42 and are preferably equi-angularly spaced about the axle 25 and disposed in a plane substantially perpendicular to the longitudinal axis of the hub. Each clamp part 40,42 has a pair of outwardly extending ears or tabs 45,46 which are provided with holes through which fasteners, such as bolts 43, are passed and secured by nuts 41.

As seen in FIGS. 1 and 2, the clamp parts or bands 40,42 are arranged to clamp or grip the outer circumferential surface of the hub 14 at the inner end 17 thereof. Since the clamp 21 is made in two parts, it can be secured to the inner end of the hub without removing the hub 14 from the axle 25.

To assemble the lubrication apparatus of the present invention to a wheel hub, hub cap 18 is mounted to the outer end 17 of hub 14 by appropriate means, such as a cylindrical tool one end of which engages the annular bead 24 and is adapted to be struck on the other end by a hammer or the like. An especially tight fit is achieved between bore 16 and rim 26, 26' or 26" by virtue of protrusions 28, threads 30 or ribs 32. After the seal 27 is positioned in the bore 16 adjacent bearing 13, annular clamp 21 is mounted to the inner end 17 of the hub by placing bands 40, 42 about opposite sides of the hub and securing them together by bolts 43 and nuts 41. The seal 27 is thus retained in place in the bore 16 but is permitted to flex to some extent between the fingers 44.

To operate the lubrication apparatus according to the method of the invention, grease is introduced under pressure through the grease fitting 34 into the hub cavity, around the axle 25 and through the bearings 12,13. Once the hub cavity is completely filled, the introduction of additional grease into the fitting 34 results in an increase in pressure inside the cavity. The increased pressure causes seal 27 to yield in the spaces between fingers 44 since no other overflow or pressure relief opening is provided. Fingers 44 of clamp 21 prevent the seal 27 from becoming completely dislodged. During each subsequent lubrication process, substantially the entire volume of used and/or contaminated grease in the hub cavity can be displaced by clean, uncontaminated grease introduced through fitting 34. Moreover, visual observation of the grease escaping from the seal 27 during injection of grease virtually assures that all dirt and contaminated grease has been flushed from the hub cavity.

Although certain preferred embodiments of the invention have been described herein, it will be apparent to those skilled in the art to which the invention pertains that variations and modifications of the described embodiment may be made without departing from the true spirit and scope of the invention. Accordingly, it is intended that the invention be limited only to the extent required by the appended claims and the applicable rules of the law.

What is claimed is:

1. Apparatus for cleaning or lubricating wheel bearings comprising:
   a wheel hub having a first end, a second end opposite said first end, and a bore;
   at least one wheel bearing means mounted in said bore intermediate said first and second ends for rotatably supporting an axle;
   means provided at said first end for introducing lubricant under pressure into said bore;
   means provided at said second end for permitting escape of said lubricant from said bore, said lubricant escape means comprising an annular seal mounted in said bore adjacent one of said bearings, said seal being outwardly yieldable in relation to said bearing to permit escape of the lubricant from the bore; and
   means for clamping said seal in said bore such that said seal is outwardly yieldable, said clamping means comprising a first semicircular band, a second semicircular band, at least one finger extending from one edge of said first and second bands means for connecting said first and second bands such that the fingers of said bands engage said seal and said bands are secured to the second end of the hub.

2. The lubricating apparatus of claim 1, wherein said connecting means comprises a first pair of ears, extending outwardly from the ends of said first band, and a second pair of ears extending outwardly from said second band, said first and second pairs of ears each defining apertures through which fasteners are secured.

3. The lubricating apparatus of claim 1, wherein said lubricant introducing means comprises:
   a hub cap having a closed end and an open end, said open end terminating in an annular rim adapted to engage said bore;
   a lubrication fitting secured to said closed end.

4. The lubricating apparatus of claim 3, further comprising a plurality of protrusions integrally formed along said rim for creating a friction fit between the annular rim of said hub cap and the bore of said hub.

5. The lubricating apparatus of claim 3, further comprising threads integrally formed on said rim for threadably engaging the bore of said hub.

6. The lubricating apparatus of claim 3, further comprising a plurality of annular ribs formed on said rim for increasing the friction fit between the annular rim of said hub cap and the bore of said hub.

7. Apparatus for cleaning and lubricating a wheel bearing comprising:
   a wheel hub having a first end, a second end opposite said first end, and a bore;
   at least one wheel bearing means mounted in said bore intermediate said first and second ends for rotatably supporting an axle;
   means provided at said first end for introducing lubricant under pressure into said bore; and
   seal means provided at said second end for sealing the lubricant in said bore and for permitting escape of the lubricant from the second end of said wheel hub when the lubricant is introduced under pressure into said first end, said seal means comprising an annular seal, said seal being yieldable in response to the pressure of the lubricant to permit the escape of lubricant from the second end of said wheel hub, and means for retaining said seal in said bore, said seal retaining means comprising a band clamped about said second end of the wheel hub, said band having an edge, a plurality of trapezoidally shaped fingers extending from the edge of said band, said fingers being engagable with first portions of said seal when lubricant is introduced under pressure into said first end of the wheel hub, second portions of said seal being yieldable away from said bearing means to permit escape of the lubricant under pressure from said second end of the wheel hub.

8. Apparatus according to claim 7, wherein said lubricant introducing means comprises a hub cap in said first end and a lubrication fitting secured in said hub cap.

9. Apparatus according to claim 7, wherein said band comprises two band parts, said fingers being integrally formed with said band parts.

10. Apparatus according to claim 9, wherein said lubricant introducing means comprises a hub cap in said first end and a lubrication fitting secured in said hub cap.

* * * * *